United States Patent
Brisebois et al.

(10) Patent No.: US 6,738,809 B1
(45) Date of Patent: May 18, 2004

(54) NETWORK PRESENCE INDICATOR FOR COMMUNICATIONS MANAGEMENT

(75) Inventors: Michel A. Brisebois, Wakefield (CA); Desmond J. Ryan, Ottawa (CA); Marilyn French-St. George, Alcoe (CA); Laura Mahan, Kanata (CA); John I. Johnson, Kinburn (CA); Jobe L. W. Roberts, Wakefield (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/137,688

(22) Filed: Aug. 21, 1998

(51) Int. Cl.[7] .............................................. G06F 15/177
(52) U.S. Cl. ........................ 709/224; 345/736; 345/172
(58) Field of Search ............................... 709/224, 223, 709/219, 221; 345/329, 359, 734, 736, 733, 744, 163, 172

(56) References Cited

U.S. PATENT DOCUMENTS

| | | | | |
|---|---|---|---|---|
| 5,051,984 A | * | 9/1991 | Mostafa et al. ................ 370/39 |
| 5,566,339 A | * | 10/1996 | Perholtz et al. .............. 395/750 |
| 5,751,965 A | * | 5/1998 | Mayo et al. ............ 395/200.54 |
| 5,793,366 A | * | 8/1998 | Mano et al. ................ 345/329 |
| 5,796,393 A | | 8/1998 | MacNaughton et al. ..... 345/733 |
| 5,958,016 A | * | 9/1999 | Chang et al. ................ 709/229 |
| 5,999,208 A | * | 12/1999 | McNerney et al. ............ 348/15 |
| 6,003,079 A | * | 12/1999 | Friedrich et al. ............ 709/224 |
| 6,057,834 A | * | 5/2000 | Pickover ..................... 345/329 |
| 6,094,681 A | * | 7/2000 | Shaffer et al. .............. 709/224 |
| 6,112,015 A | * | 8/2000 | Planas et al. .......... 395/200.53 |
| 6,133,919 A | * | 10/2000 | Bormann et al. ........... 345/349 |
| 6,243,452 B1 | * | 6/2001 | O'Shaughnessey et al. . 379/201 |
| 6,246,409 B1 | * | 6/2001 | Veghte et al. ................ 345/356 |
| 6,421,707 B1 | * | 7/2002 | Miller et al. ................. 709/206 |

FOREIGN PATENT DOCUMENTS

| | | |
|---|---|---|
| EP | 0 626 635 A2 | 11/1994 |
| WO | WO 98/26540 | 6/1998 |

* cited by examiner

*Primary Examiner*—Dung C. Dinh
(74) *Attorney, Agent, or Firm*—Finnegan, Henderson, Farabow, Garrett & Dunner, L.L.P.

(57) ABSTRACT

To provide telephony-like interfaces to a computer network, a computer system has a visual display device that continually displays a network status icon indicating network status information. The icon can have segments corresponding to different communications environments, and the icon and the segments will change some characteristic, such as shape, size, or color, to indicate the presence of some network event or the status of some network parameter.

15 Claims, 12 Drawing Sheets

NETWORK PRESENCE INDICATOR FOR COMMUNICATIONS MANAGEMENT

I. BACKGROUND OF THE INVENTION

Telephone users currently have a relatively simple network access mechanism. To make a call, they lift the receiver, hear a dial-tone, and dial the number. To answer a call when they hear the telephone ring, they pick up the receiver and start talking. Telephone users do not need to know the data transmission path, the type of receiving device, other than the number, or the "called party location." In addition, the network is always active and available, even without power.

Computer users on the other hand, have "launch-application" mechanisms to access a network. They also generally need significant knowledge to configure a terminal device to access the network and to configure a data file to meet a receiving device's configuration. When receiving communications, notification is usually application-specific, and either lies buried below other open applications or becomes intrusive by capturing the computer display and denying access to other applications.

The telephony industry has made significant progress in developing and simplifying call management services, such as call waiting, calling line identification, conferencing, etc. For example, many of these features currently offer a degree of personalization. Once again in the computing industry, similar features are generally application-specific. Most conferencing, file sharing and E-mail applications, for example, still require an appropriate application to be open for them to work.

Other fundamental conflicts exist between telephony-based and computer-based models of communication management. In the telephony model, call management features are provided remotely by subscription or locally by peripherals (e.g., answering machines and fax routers). The telephony network also supports notification of convergent incoming calls (spontaneous call waiting identification, SCWID), and allows users to manage potential interruptions (deluxe spontaneous call waiting identification, DSCWID).

In the computing model, call management features are provided by device-resident local applications that may or may not be open while the user is operating a terminal device for something other than networked interactions. Conflicting incoming communications become messages directed to "in-boxes," and with the advent of IP-phones, synchronous interruptions will become a serious computing problem.

There is, therefore, a need for telephony-like user interfaces for computer-based applications and for interfaces that provide the users with current network information. Additional goals and advantages will be set forth in part in the description which follows, and in part will be obvious from the description, or may be learned by practice of the invention.

II. SUMMARY OF THE INVENTION

A computer system consistent with this invention is coupled to a network through a network service provider and comprises a user interface and a processor for controlling the user interface. The processor includes status presentation means for continually presenting on the interface a network status indicator representing network status information; network interface means for communicating with the network service provider to receive updates of network status information; and update means for controlling properties of the presented indicator according to the received updates of network status information.

A method consistent with this invention displays an indication of network status on a computer system coupled to a network through a network service provider. The method comprises the steps of: presenting on a user interface a network status indicator representing network status information; communicating with the network service provider to receive updates of network status information; and controlling properties of the presented indicator according to the received updates of network status information.

Both the foregoing general description and the following detailed description are exemplary and explanatory only, and do not restrict the invention claimed. The accompanying drawings, which are incorporated in and constitute a part of this specification, illustrate some systems and methods consistent with the invention and, together with the description, explain the principles of the invention.

IV. DESCRIPTION OF THE PREFERRED EMBODIMENT

A. Overview

The drawings show one system consistent with this invention as a distributed application that integrates telephony-based and computer-based communication management mechanisms with a single, easy-to-use interface. While the user is connected to a communications network, the system represents the status of the network with a status indicator, such as an icon. The indicator can be divided into segments each corresponding to a separate communications area environment, such as for business concerns, for a personal concerns, etc. When divided in this way, each segment of the network status indicator represents the status of the network (e.g., the presence of a message), for the corresponding area.

A user can also use the indicator to manage communications in the corresponding environment. For example, by selecting a segment, the user could access an environment and send or receive messages, create E-mail groups, or perform other tasks. The system also enables a user to employ prioritization mechanisms and communicate in a variety of ways, such as visually or audibly.

B. Network Components

Figure 1:
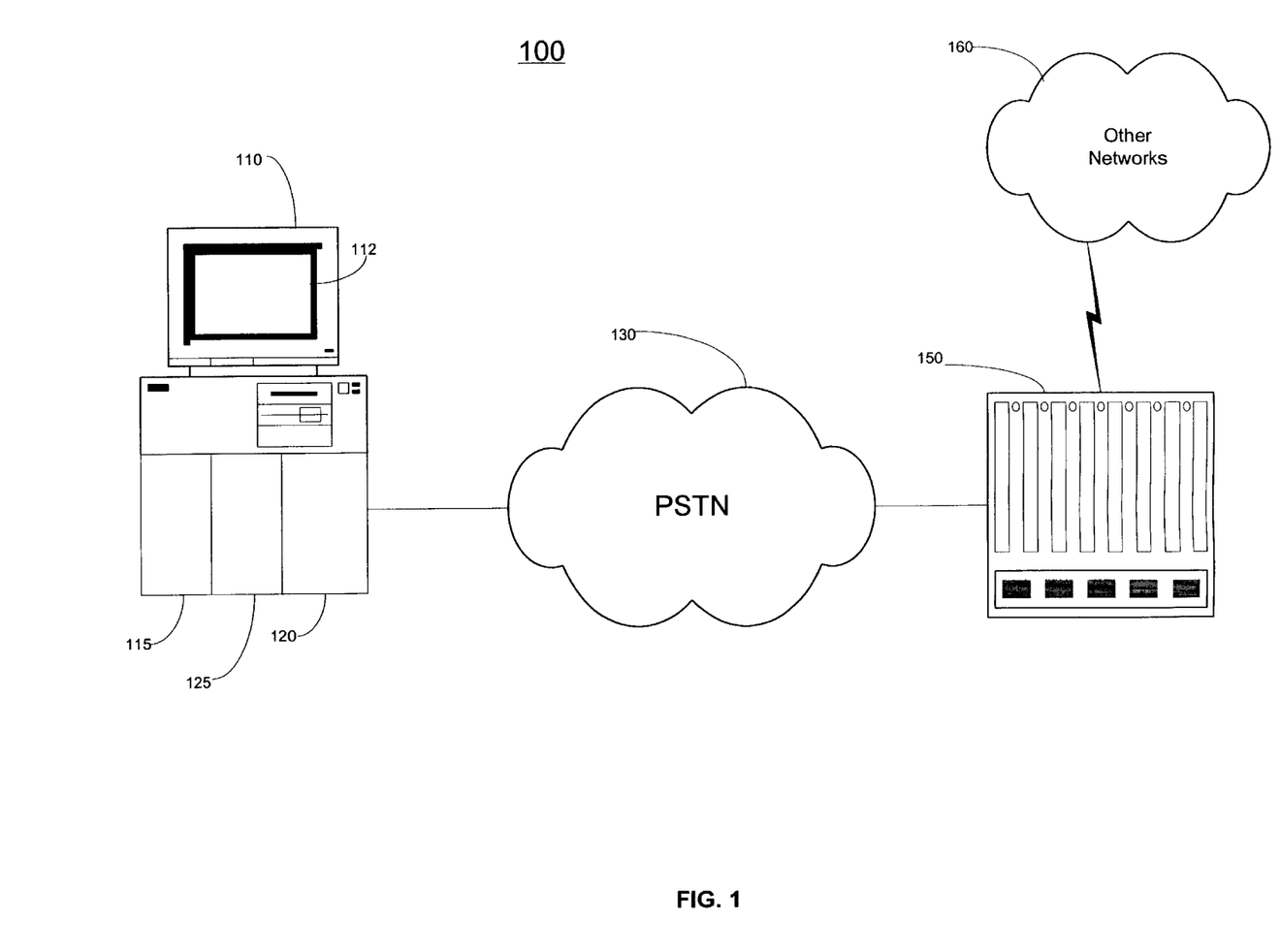
FIG. 1 is a diagram showing an example of a system consistent with this invention.

FIG. 1 shows an example of a network using a system consistent with this invention. In network 100, a computer system 110 includes driver software 115 that receives the network information and presents it as a network status indicator, such as by displaying it as an icon or producing an auditory equivalent called an "earcon." Driver software 115 communicates with interface software 120 that receives regular information packets from a network service provider, as well as special messages indicating specific communications, such as E-mail messages. Communications manager 125, which is coupled to driver software 115 and interface software 120, manages the actual communications functions, such as message handling, port configuration, and protocol management.

In one embodiment consistent with the present invention, interface software 120 could be implemented as an application or extension to an operating system to continuously run in the background making calls over a network to a server, in essence, waiting for a communication event such as an E-mail, voice or video call. Driver software 115 can also continuously run in the background monitoring CPU (central processing unit) tasks including applications running in the background or foreground and user input through the keyboard buffer such as mouse clicks, movements, and keystrokes. By tightly integrating communications manager 125 into the operating system of a given platform through driver software 115, communications manager 125 can request to send events to the user's screen, e.g., animation or sound, or be given priority and placed at the forefront if it receives a high priority communication event from interface software 120, for example, an important incoming video call.

To implement these features in computer system 110 in many of existing operating systems, driver software 115 continuously makes a call to the CPU to be placed in a queue and push communications manager 125 to the foreground when necessary. Driver software 115 preferably runs on a preemptive multitasking environment where it can make requests to the operating system for CPU processing priority. While driver software 115, interface software 120, and communications manager 125 are preferably written in Java or C++, they can be written in any computer language best suited for a given platform.

Computer system 110 is coupled through Public Switched Telephone Network (PSTN) 130 to a Network Service Provider (NSP) 150, such as an Internet service provider. NSP 150 allows access to a network 160, which could be the Internet.

Preferably, NSP 150 continually (e.g., once per second) sends a small string or packet of data to computer system 110. Interface software 120 interprets the data to determine whether access to network 160 is possible. Interface software 120 responds to NSP 150 to acknowledge receipt, and passes the information to driver software 115 to indicate the network status. For example, if network 160 becomes bogged down, NSP 150 sends a message to computer 110 to reroute through PSTN 130. The data from NSP 150 could also indicate other features, such as available bandwidth or the presence of messages, or context information as explained below.

C. Software and Operation

1. Network Status Icon

Figure 2:
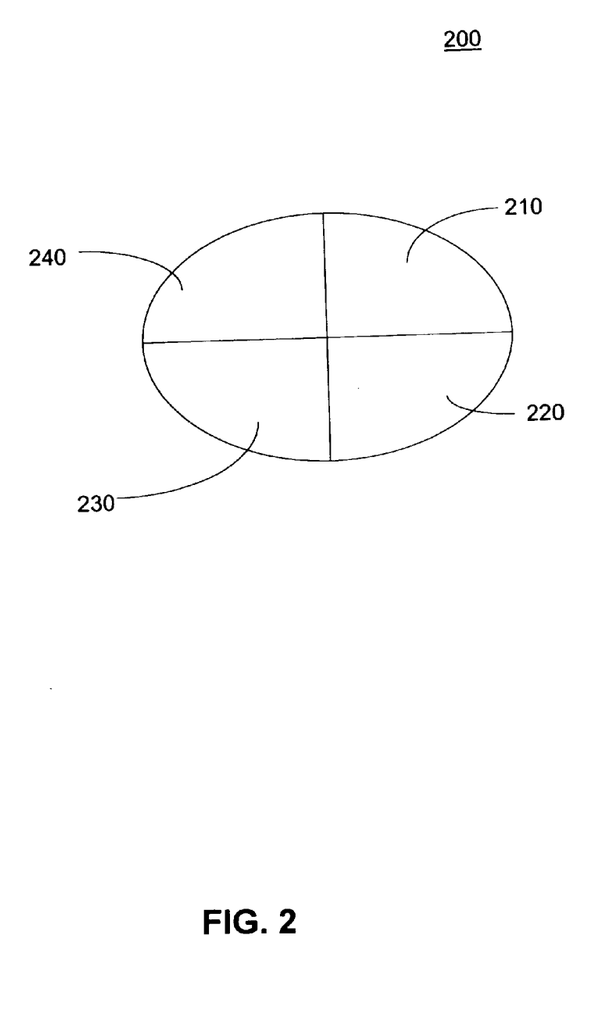
FIG. 2 is a network status icon consistent with this invention.

Based on the received information, a monitor 112 of computer 110 would display an icon, such as 200 in FIG. 2, or present some other type of indicator, such as an earcon, to indicate network availability. Systems and methods consistent with this invention ideally represent the status indicators in contextually relevant sensory modalities. For example, if a user is watching television, the system may represent the indicator as a pop-up display or an auditory signal.

In devices with visual displays, software for generating the displays, such as driver software 115, places graphical icon 200 on the topmost layer of all graphical elements, e.g., on the desktop above all other folders, documents and icons. This ensures that icon 200 will always be displayed when the network is being used.

The icon's presence preferably indicates that the network is up and running, and its shape or some other characteristic, such as size or color, preferably indicates the available bandwidth. For example, if the broadband network connection is available, icon 200 may take the shape of a circle, but if the broadband network connection is unavailable, icon 200's shape may become an ellipse, as shown in FIG. 2. Equivalent changes would be used for other types and status indicators.

Driver software 115 also makes icon 200 transparent when the user performs non-network tasks, such as opening local documents. When the user is performing network tasks, the driver software preferably moves icon 200 to parts of the display that are not in use. One way of doing this would be for driver software 115 to communicate with a windows manager (not shown) to learn which windows are currently active.

In addition, icon 200 preferably animates in the presence of incoming communication notifications. Such animation can include pulsing, changing colors, generating an auditory signal, or some other kind of desired behavior. Auditory icons can animate by representing spatial movement using stereo signals.

In FIG. 1, driver software 115 would recover the packets and data from NSP 150 and adjust the display of the icon 200 accordingly. As explained below, some functions for icon 200 require the use of communication manager 125.

Figure 3:
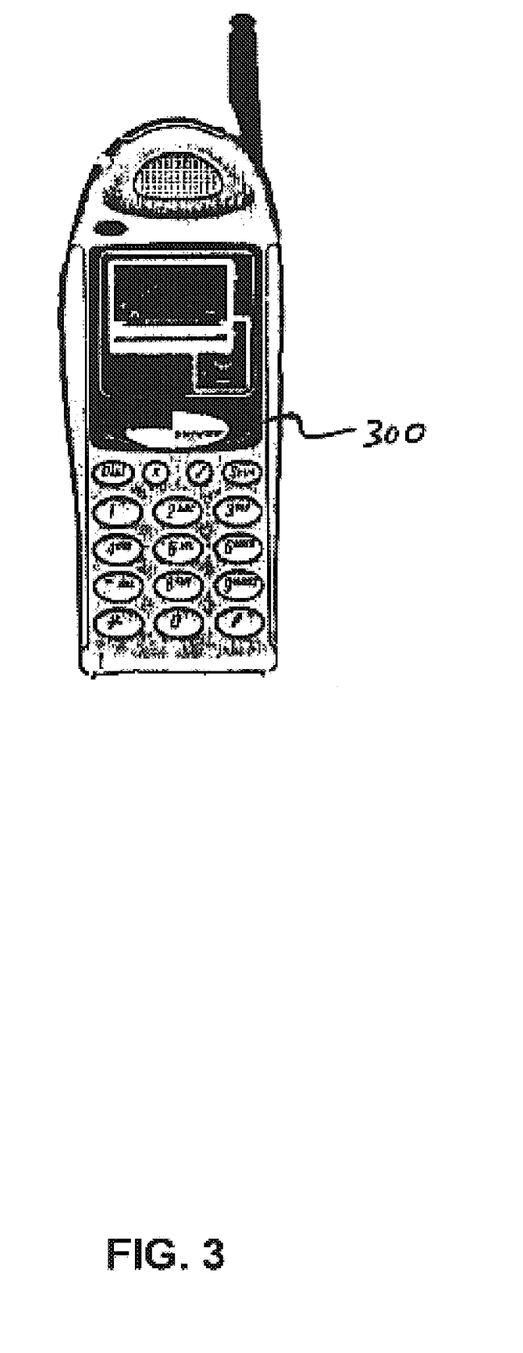
FIG. 3 is a diagram showing the network status icon in FIG. 2 with a cellular telephone.

Icon 200, or similar indicators consistent with this invention, can be used with any networked product, such as televisions, telephones, facsimile machines, refrigerators, or burglar/fire alarms. Preferably, all such devices will have a microprocessor and sensory input/output mechanism appropriate to that device. FIG. 3 shows the use of a network icon with a cellular telephone.

2. Other Manifestations

Figure 4:
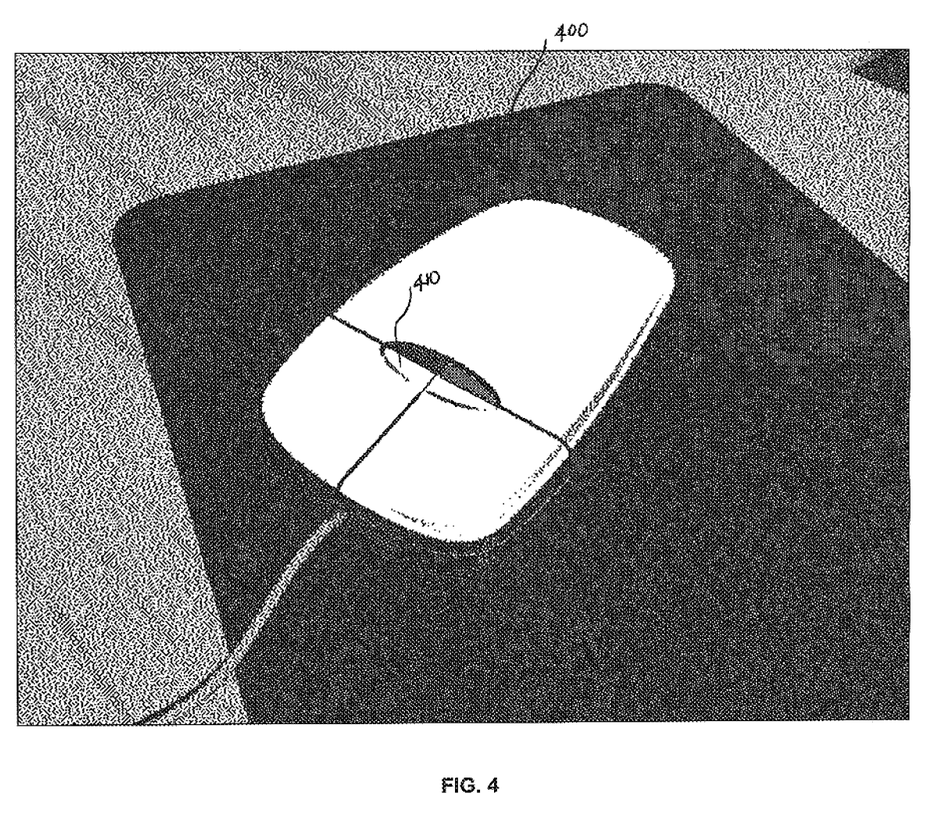
FIG. 4 is a diagram of a mouse with a physical network status button consistent with this invention.

A physical network status button could also be present on a standard input/output device such as a mouse, keyboard and tablet. FIG. 4 shows a mouse 400 with such a button 410.

The external button would provide a quick and natural response to incoming notifications and initiation of outgoing communications because access to the network is provided through the tools that the user is likely to be using with the host device. When the network presence button is activated, the network presence icon automatically appears under the cursor so the user does not have to navigate to the icon and open it.

Access to the network presence feature may also be achieved through voice commands. In such case, voice recognition software would take the place of a cursor and keyboard.

Furthermore, personal communication management (PCM) devices, such as those that are worn or carried, could have an appropriate network presence status indicator. PCM devices can also function as adjuncts to future computer-like devices, thus providing wireless remote access to personal communication management environments without interrupting work resident on the computer.

Different interaction methodologies will depend on the input/output interaction mechanisms of the host device. In new products, custom peripherals would ideally optimize access to the capabilities of the network status icon. These peripherals will likely be multi modal, i.e., use multiple sensory mechanisms. Also, existing input/output mechanisms could enable software hooks to the network status functions in legacy products.

3. Segments

The network status icon 200, or any other such icons, can also identify the status of and allow access to different user areas or communications environments, as explained above. To do this, the icon is preferably divided into segments. For example, icon 200 in FIG. 2 includes segments 210, 220, 230, and 240 that are differentiated by colors or other indicia. Each segment provides access to a corresponding communications environment that can represent a particular personal relationship class. For example, selecting segment 210 might access business contacts, family, or personal contacts. Icon 200 thus preferably represents users' communication environments in ways that are personally relevant, such as socially relevant groupings, such as family, work, clubs, etc.

Icon 200 may also illustrate organizational structures other than ones based on personal relationships. For example, by switching from a relationships view to a networked devices view, a user may be able to view the array of communication devices available within the vicinity.

As explained above with regard to the entire icon, incoming communications to an environment will animate the respective segments using graphical or auditory (or both) methods. The type of animation or other methods of indication can be whatever desired to indicate the presence of such a communication.

To access the network, a user activates one of the segments, such as by touching it or directing some software mechanism to activate it. Upon activation, the segment will expand to reveal a communications environment with an underlying organizational structure for that segment. For example, if a user wishes to access a business segment, the underlying structure might be a corporate organizational chart.

D. Communication Environments

1. Related to Segments

Figure 5:
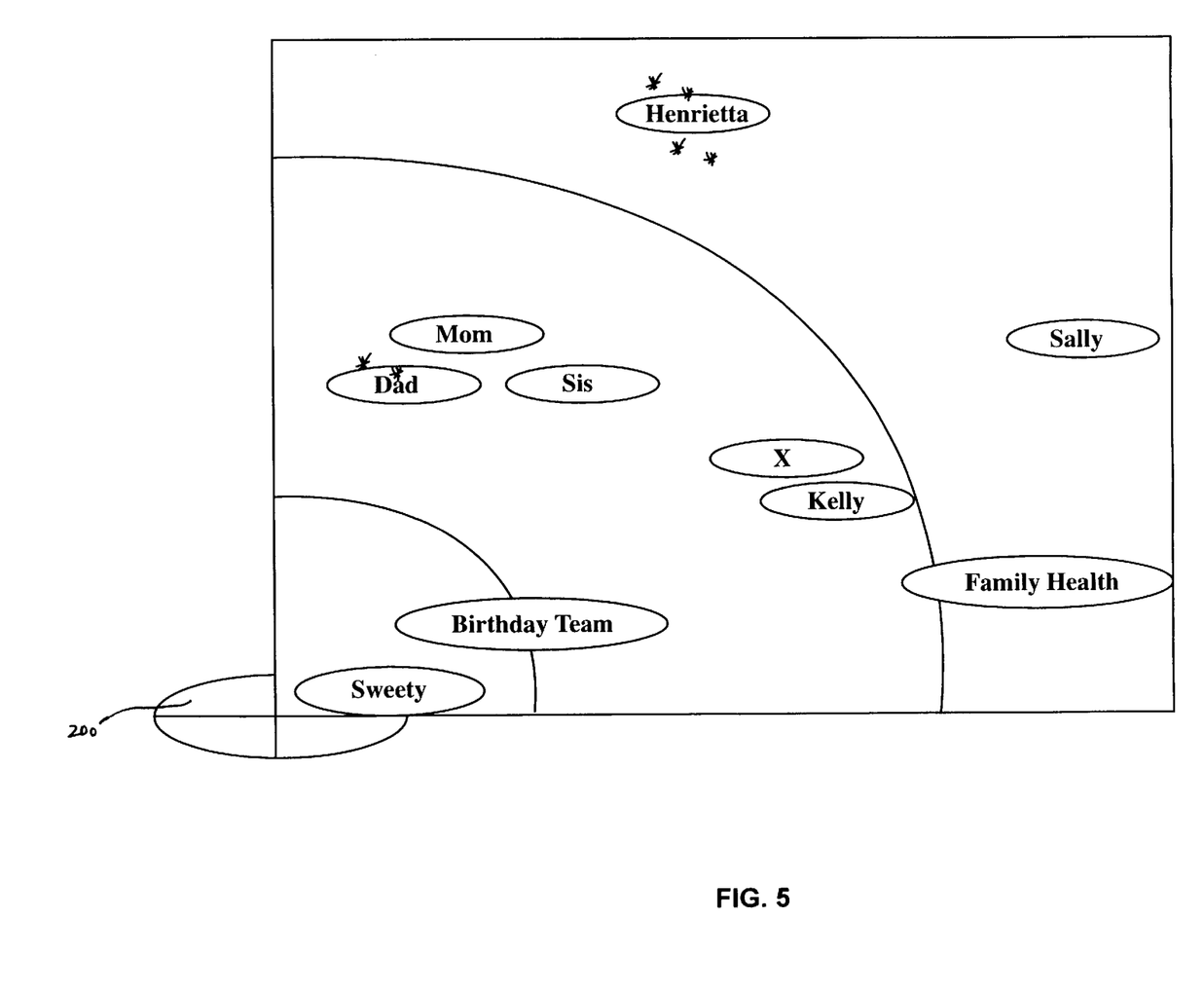
FIGS. 5, 6, and 7 show examples of a communications environment consistent with this invention.
Figure 6:
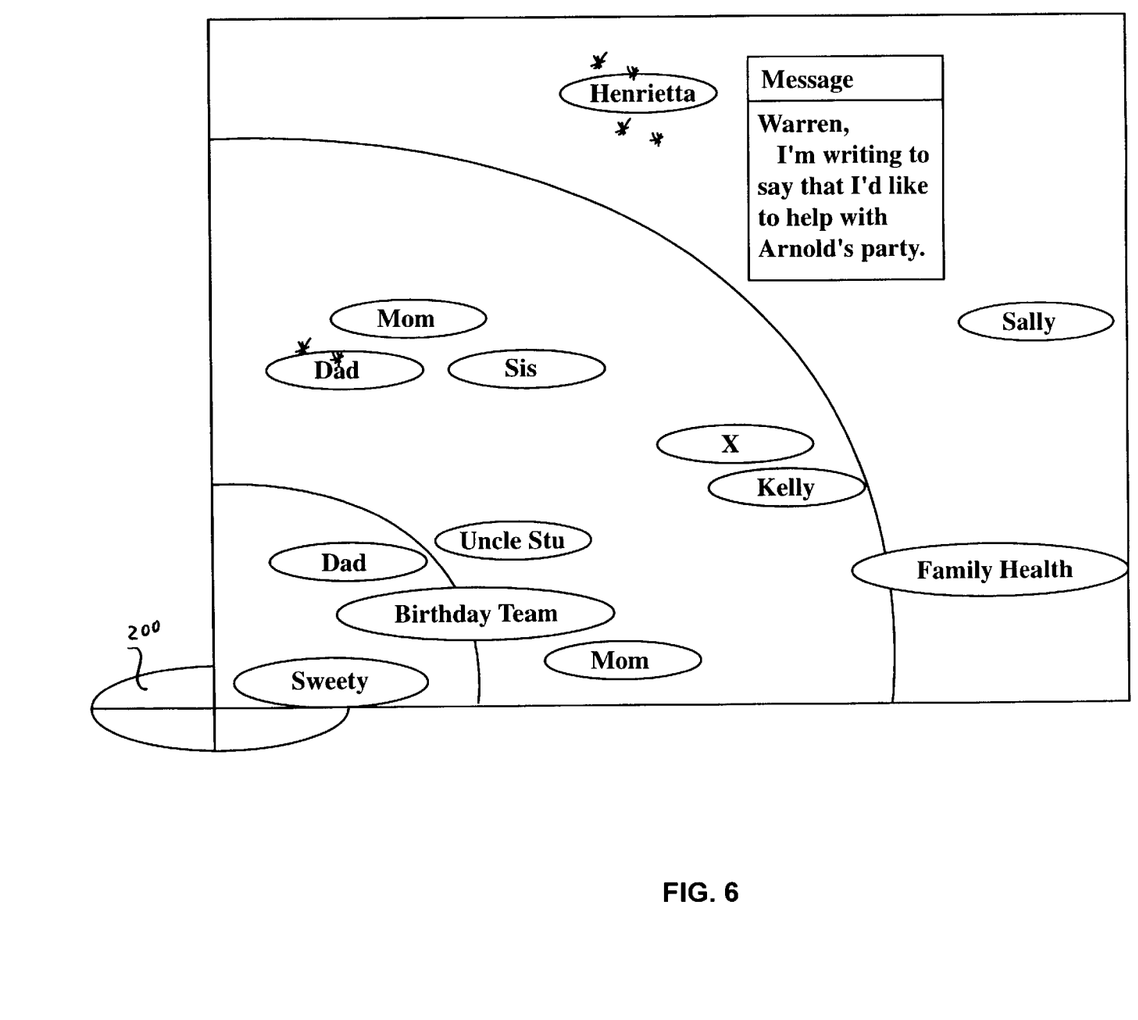
Figure 7:
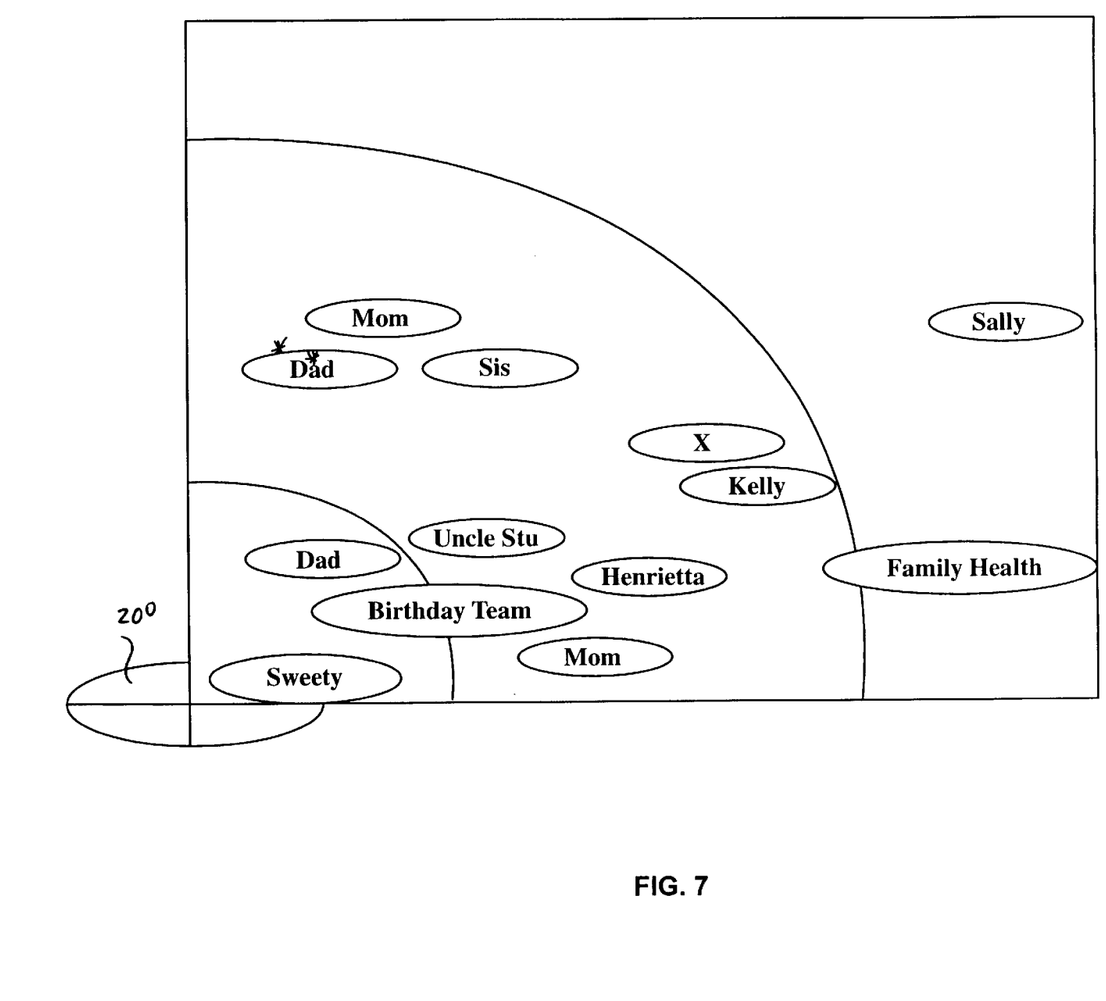

FIGS. 5, 6, and 7 show examples of a communications environment corresponding to one of the segments of icon 200, such as segment 220. FIGS. 5, 6, and 7 demonstrate how the communications environments expand from the segments of icon 200 after being selected.

The communications environments preferably contain several objects, some of which are organized into groups. The objects preferably represent persons or parties with whom a user wants to communicate, but the objects could represent any entity relevant to the user or communications environment. Although shown as visual elements, the objects could also be represented by any other appropriate sensory input, such as by an auditory indication.

The groups preferably represent organizations of objects that share some interest. For example, one group can represent members of a user's family, a bridge group, or people with whom the user shares season tickets.

Grouping is one way to use spatial relationships to represent an environment. Another way is to locate more important or more frequently accessed groups or objects near an "origin," which is at the bottom left corner in FIGS. 5, 6, and 7. That corner also corresponds to the center of icon 200.

A user can then use the communication environments to send, receive, or broadcast messages. FIGS. 5, 6, and 7 demonstrate one of the environments.

FIG. 5 shows a "family" quadrant where objects are clustered into groups, such as the birthday team. The stars around the "Henrietta" object indicate a message from "Henrietta." Clicking on that object opens the message.

As shown in FIG. 6, which represents the communication environment after opening the message from Henrietta, the message indicates a desire to help with a special project. The user could then drag the Henrietta object to the "birthday team" cluster in the lower left-hand corner and automatically add her to that cluster, as shown in FIG. 7. To send a message to the members of the "birthday team," one could select that team and then compose and send the team the message.

Users can also place objects representing one person into more than one cluster. For example, FIG. 6 shows the "Dad" object in a nuclear family cluster and in a "birthday team" cluster, and communications can occur within the context of his role as a family member or his role as a member of the "birthday team."

Preferably, incoming communication events will automatically cluster with similar previous events. Clustering can be based on context information acquired by the network, or input by the caller. In such a case, communications manager 125 would use context information from the network to determine which cluster pertains to an event, such as a message. Information about network context information appears in U.S. Pat. No. 6,310,944.

Control of the functions in each environment is under the control of communications manager 125 and driver software 115. Together they control the appearance and operation of the communications environment.

Auditory animation could invoke earcons representing the respective segment. Earcons and graphical animations will convey incoming communication status information such as communication priority, conference connection, etc. In addition, spatial location within a segment will preferably reflect the priority or frequency of communication assigned to that individual. Spatial location may also reflect the spatial organization of the relationships within icon 200 by appearing to come from the left or right. By controlling the time delays in a stereo speaker system, similar types of movement can be represented auditorially as well.

Network status icon 200 can also be used with the communications environments to perform other tasks that currently require special software. For example, sending computer-created documents to another person currently requires the user to close the document and move the file to the receiving in-box, or attach the closed document to an E-mail notification. A user could instead select a segment, open an environment, and drag and drop a document page, or the whole document, onto an appropriate object and invoke the proper call management command within the environment. The commands, which could be represented by modem icons, facsimile icons, or telephone icons, indicate how a communication is to take place. Communication manager 125 would then implement the communication.

2. Mini-environments

In addition, third-party vendors, or users themselves, can create custom call management mini-environments that enable customized communicating options. Mini-environments allow vendors to customize communication channels for particular markets by creating custom graphical and auditory scenes, restricting communication channels (e.g., bandwidth, time-of day), or limiting the number of people that can be accessed through the environment. Customized billing may also be associated with these mini-environments.

FIGS. 8, 9, 10, 11, and 12 also show examples of a mini-environment that a little league baseball organization could create for a coach. The graphical and auditory appearance of the mini-environment might look like a baseball diamond, and the mini-environment might reside in a user's recreational segment.

The mini-environment in FIGS. 8, 9, 10, 11, and 12 allows a coach to configure preferred communication channels (voice to some, E-mail to others, and fax to others), and then create and send a text or voice announcement to the players, relying on the network to make the appropriate media conversions to match the players' preferred communication channels. The mini-environment may also support reminder announcements.

Figure 8:
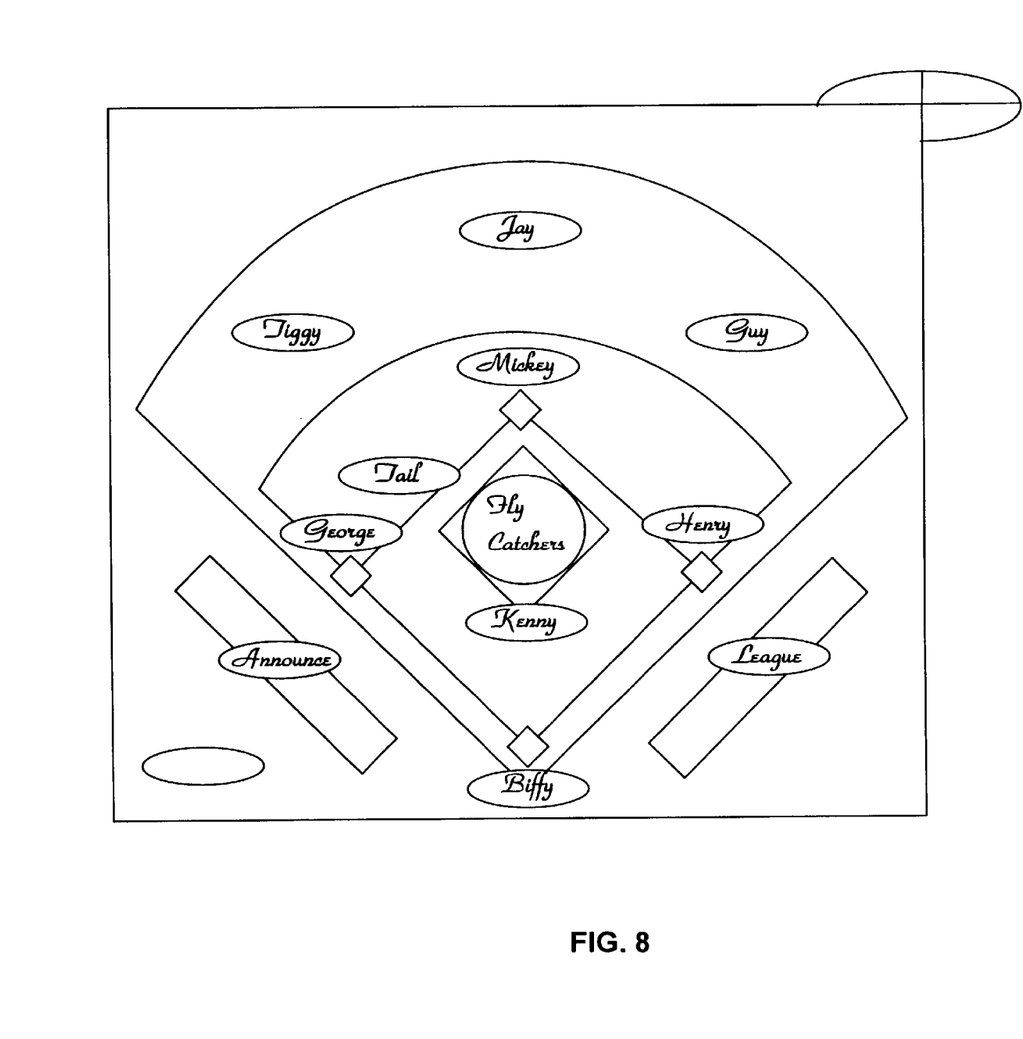
FIGS. 8, 9, 10, 11, and 12 show examples of a mini-environment consistent with this invention.
Figure 9:
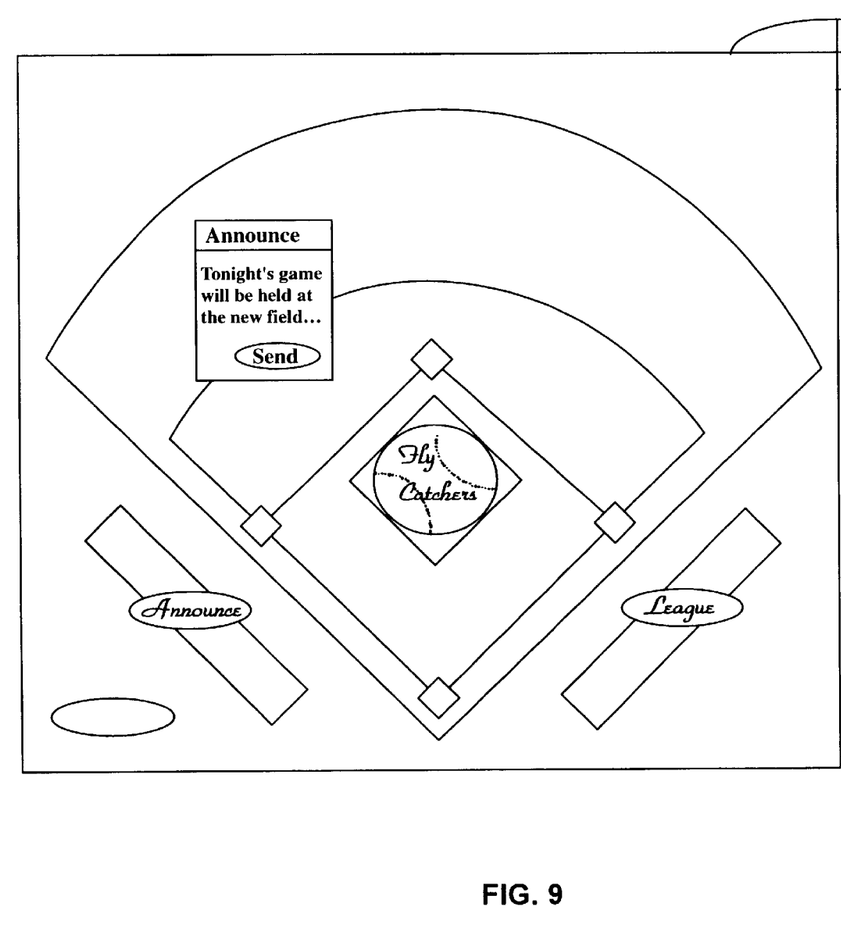

For example, FIG. 8 shows the coach selecting the "announcement" object, allowing the coach to type a message as a text note, as shown in FIG. 9, in this case reminding the players of the game. The message is sent as an "RSVP" message meaning that upon receipt, the players can automatically reply either "yes" or "no." Selecting "custom" in the message allows receipt of custom replies as part of the automatic reply.

Figure 10:
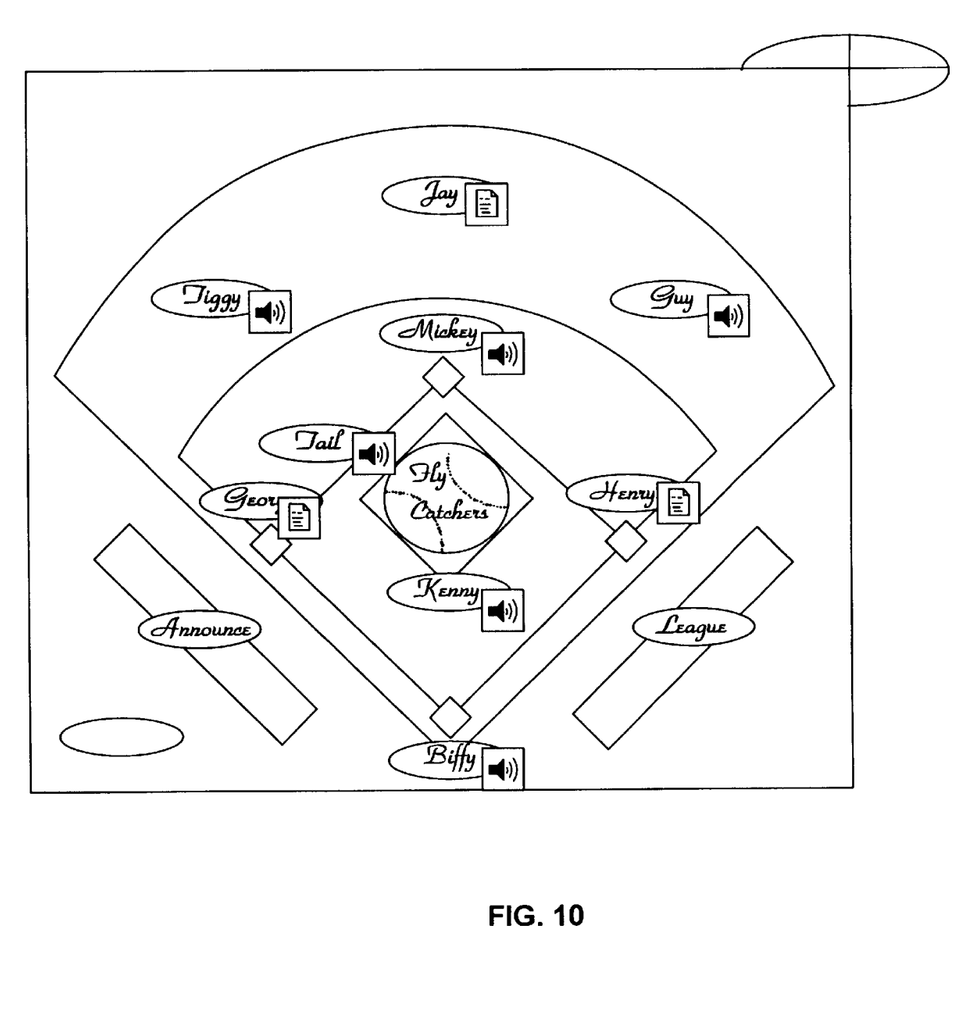

As FIG. 10 shows, the text message is sent out to the players. Where players do not have access to text displays, the message is automatically converted to a voice message, shown by the speaker with the sound wave, and delivered telephonically. Conversely, a voice message could have been converted to text and delivered as an E-mail message to players with the document icon.

Figure 11:
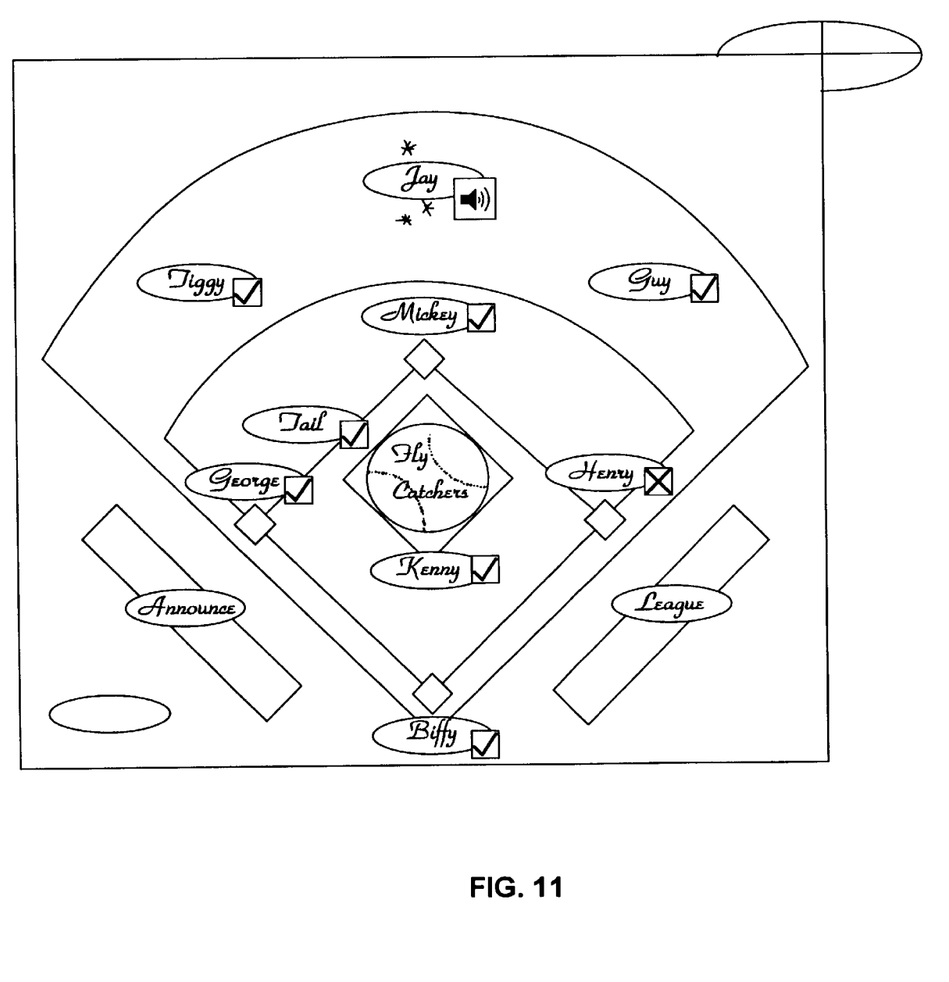
Figure 12:
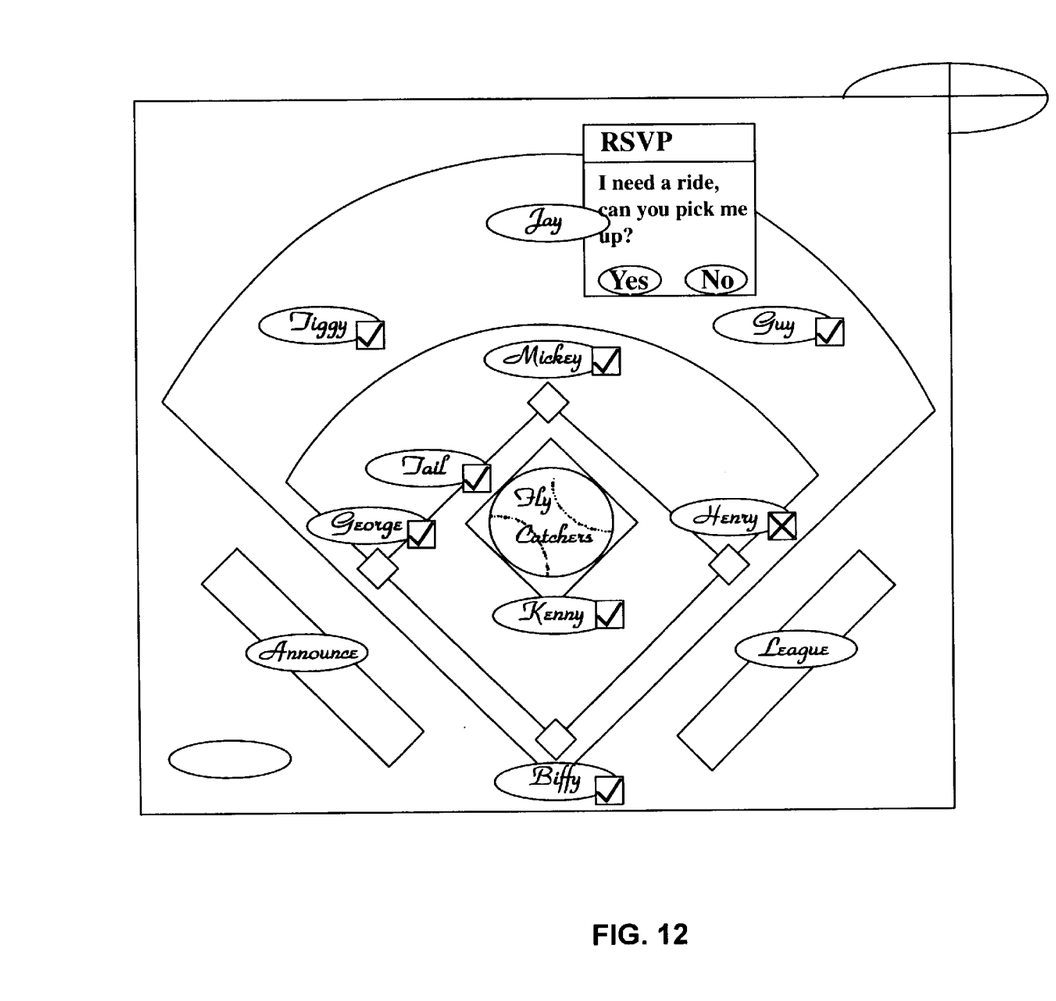

FIG. 11 shows the receipt of the RSVP responses. Those with a white check can make the game, but one cannot, and his response is shown by a white x. One player, Jay, has responded with a voice message. As FIG. 12 shows, the voice message asks the coach for a ride and is itself an RSVP message. This allows the coach to respond automatically with either "yes" or "no."

D. Conclusion

Use of network status indicators, such as icons or earcons, thus provide users with current network information in an easy-to-use form similar to that provided by telephony models. Furthermore, the status indicators along with the environments provide telephony-like user interfaces for computer-based applications and integrate communication management structures and mechanisms.

Those skilled in the art will appreciate that various modifications and variations can be made in systems and methods consistent with this invention without departing from the scope or spirit of the invention. For example, the icons and the environments and be divorced and used without the other. The specification and examples should be considered only as illustrative, with the true scope and spirit of the invention being indicated by the following claims.

What is claimed is:

1. A computer system coupled to a network through a network service provider, the network enabling communication between a first end-user and one or more second end-users at one or more destinations for the communication, the computer system comprising:
    a user interface including a visual display device; and
    a processor for controlling the user interface, the processor including status presentation means for continually presenting on the visual display device of the user interface to the first end-user a personal status indicator icon representing network status information such that the network status information is definable by the first end-user to represent the status of communication with the first end-user of the user interface and the one or more second end-users at the one or more destinations for the communication,
    network interface means for communicating with the network service provider to receive updates of network status information and for receiving information regarding a bandwidth of the network available to the computer system, and
    update means for controlling properties of the personal status indicator icon according to the updates of network status information, such that the display of the icon is adjusted to reflect the bandwidth of the network available to the computer system.

2. The computer system of claim 1, wherein the user interface includes an audio device, and
    wherein the status presentation means includes means for producing an audio signal indicating status.

3. The computer system of claim 1 having an operational mode during which the computer system can execute application programs, wherein the processor also includes
    a device controller for controlling an image displayed on the device, and wherein the status presentation means further includes
        means, in communication with the device controller, for ensuring that the icon is displayed on the device during the operational mode regardless of the image displayed.

4. The computer system of claim 1, wherein the network interface means includes
    means for receiving information regarding the ability of the network to permit communication, and
    wherein the update means includes
        means for adjusting the display of the icon to indicate the ability of the network to permit communication.

5. The computer system of claim 1, wherein the network interface means includes
    means for receiving information regarding a specific network activity, and wherein the update means includes
        means for adjusting the display of the icon to indicate the specific network activity.

6. The computer system of claim 1, wherein the update means includes
    means for changing the shape of the icon.

7. The computer system of claim 1, wherein the update means includes
    means for changing a color of the icon.

8. A method for displaying a personal indication of network status on a computer system coupled to a network through a network service provider, the network enabling communication between a first end-user and one or more second end-users at one or more destinations for the communication, the method comprising the steps of:
    presenting continually on a visual display of a user interface to the first end-user a personal status indicator icon representing network status information such that the network status information is definable by the first end-user to represent the status of communication with the first end-user of the user interface and the one or more second end-users at the one or more destinations for the communication;
    communicating with the network service provider to receive updates of network status information, the updates including information regarding a bandwidth of the network available to the computer system; and
    controlling properties of the presented personal status indicator icon according to the received updates of network status information, such that the display of the icon is adjusted to indicate the bandwidth of the network available to the computer system.

9. The method of claim 8, wherein the user interface includes an audio device, and wherein the step of presenting includes the substep of producing an audio signal indicating status.

10. The method of claim 8 having an operational mode during which the computer system can execute application programs, and wherein the step of presenting includes the substep of ensuring that the icon is displayed on the device during the operational mode regardless of the image displayed.

11. The method of claim 8, wherein the step of communicating with the network service provider includes the substep of receiving information regarding the ability of the network to permit communication, and wherein the step of controlling properties of the presented personal status indicator icon includes the substep of adjusting the display of the icon to indicate the ability of the network to permit communication.

12. The method of claim 8, wherein the step of communicating with the network service provider includes the substep of receiving information regarding a specific network activity, and wherein the step of controlling properties of the presented personal status indicator icon includes the substep of adjusting the display of the icon to indicate the specific network activity.

13. The method of claim 8, wherein the step of controlling properties of the presented personal status indicator icon includes the substep of changing the shape of the icon.

14. The method of claim 8, wherein the step of controlling properties of the presented personal status indicator includes the substep of changing a color of the icon.

15. A computer system coupled to a network through a network service provider, the computer system comprising:

a user interface; and a processor for controlling the user interface, the processor including status presentation means for continually presenting on the user interface to a user a personal status indicator representing network status information wherein the network status information is definable by the user and indicates the status of communication with the user of the user interface and one or more destinations for the communication, and wherein the network status information includes available bandwidth information, network interface means for communicating with the network service provider to receive updates of network status information, and means for controlling properties of the personal status indicator according to the updates of network status information.

* * * * *